United States Patent [19]

Vail, III

[11] Patent Number: 5,223,794
[45] Date of Patent: Jun. 29, 1993

[54] METHODS OF OPERATION OF APPARATUS MEASURING FORMATION RESISTIVITY FROM WITHIN A CASED WELL HAVING ONE MEASUREMENT AND TWO COMPENSATION STEPS

[75] Inventor: William B. Vail, III, Bothell, Wash.

[73] Assignee: Para Magnetic Logging, Inc., Woodinville, Wash.

[21] Appl. No.: 754,965

[22] Filed: Sep. 4, 1991

Related U.S. Application Data

[60] Division of Ser. No. 434,886, Nov. 13, 1989, Pat. No. 5,075,626, which is a continuation-in-part of Ser. No. 89,697, Aug. 26, 1987, Pat. No. 4,882,542, which is a continuation-in-part of Ser. No. 927,115, Nov. 4, 1986, Pat. No. 4,820,989.

[51] Int. Cl.$^5$ .............................................. G01V 3/20
[52] U.S. Cl. ..................................... 324/368; 324/370
[58] Field of Search ........................ 324/368, 347-367, 324/369-375

[56] References Cited

U.S. PATENT DOCUMENTS

| | | | |
|---|---|---|---|
| 2,729,784 | 1/1956 | Fearon | 324/368 |
| 4,796,186 | 1/1989 | Kaufman | 324/368 X |
| 4,804,906 | 2/1989 | Hamberg et al. | 324/368 X |
| 4,820,989 | 4/1989 | Vail, III | 324/368 |
| 4,882,592 | 11/1989 | Vail, III | 324/368 |
| 5,043,668 | 8/1991 | Vail, III | 324/368 |
| 5,043,669 | 8/1991 | Vail, III | 324/368 |

FOREIGN PATENT DOCUMENTS

| | | | |
|---|---|---|---|
| 2207278 | 6/1974 | France . | |
| 03657 | 5/1988 | World Int. Prop. O. | 324/368 |

OTHER PUBLICATIONS

Mamedou, "Effectiveness of Resistivity Logging of Cased Wells by a Six-Electrode Device", IZV. VYSSH. Ucheb. Zavedenii. Neft Gaz No. 7, Jul. 1987, pp. 11-15.

Primary Examiner—Gerard R. Strecker
Assistant Examiner—Warren S. Edmonds

[57] ABSTRACT

Methods of operation of an apparatus having at least two pairs of voltage measurement electrodes vertically disposed in a cased well to measure the resistivity of adjacent geological formations from inside the cased well. During stationary measurements with the apparatus at a fixed vertical depth within the cased well, the invention herein discloses methods of operation which include a measurement step and subsequent first and second compensation steps respectively resulting in improved accuracy of measurement. First and second order errors of measurement are identified, and the measurement step and two compensation steps provide methods to substantially eliminate their influence on the results. A multiple frequency apparatus adapted to movement within the well is described which simultaneously provide the measurement and two compensation steps.

2 Claims, 6 Drawing Sheets

METHODS OF OPERATION OF APPARATUS MEASURING FORMATION RESISTIVITY FROM WITHIN A CASED WELL HAVING ONE MEASUREMENT AND TWO COMPENSATION STEPS

This invention was made with co-funded financial support from: (a) U.S. Department of Energy (DOE) Grant No. DE-FG19-88BC14243 entitled "Proof of Feasibility of Thru Casing Resistivity Technology"; and (b) Gas Research Institute (FRI) Contract No. 5088-212-1664 entitled "Proof of Feasibility of the Through Casing Resistivity Technology". The government and the GRI have certain rights in this invention. The government also has certain rights in U.S. Pat. No. 4,882,542 and U.S. Pat. No. 4,820,989 under DOE Grant No. DE-FG06-84ER13294, entitled "Validating the ParaMagnetic Logging Effect", awarded by the Division of Advanced Energy Projects, Office of Basic Energy Sciences, of the DOE.

This application is a divisional application of a still pending and earlier continuation-in-part application entitled "An Electronic Measurement Apparatus Movable in a Cased Borehole and Compensating for Casing Resistance Differences"; which is Ser. No. 07/434,886; which has filing date of No. 13, 1989, now U.S. Pat. No. 5,075,626. Portions of the application have been disclosed in Disclosure Document No. 228,642 with filing date of Jun. 5, 1989 whose expiration date was extended in Disclosure Document 272,281 with filing date of Jan. 28, 1991.

Application Ser. No. 07/434,886 is a continuation-in-part application of an earlier continuation-in-part application having the title of "Methods and Apparatus for Measurement of Electronic Properties of Geological Formations Through Borehole Casing"; which is Ser. No. 07/089,697; which has the filing date Aug. 26, 1987; and which issued on Nov. 21, 1989 as U.S. Pat. No. 4,882.542. incorporated herein by reference.

The earlier continuation-in-part application with Ser. No. 07/089,697 is derived from the original parent application having the title "Methods and Apparatus for Measurement of the Resistivity of Geological Formations from Within Cased Boreholes"; which has Ser. No. 06/927,115; which has the filing date of No. 4, 1986; and which issued on Apr. 11, 1989 as U.S. Pat. No. 4,820,989, incorporated herein by reference.

This invention provides improved methods and apparatus for measurement of the electronic properties of formations such as the resistivities, polarization phenomena, and dielectric constants of geological formations and cement layers adjacent to cased boreholes and for measuring the skin effect of the casing present. The terms "electronic properties of formations" and "electrochemical properties of formations" are used interchangeably herein. The methods disclosed in the application provide for improved measurement accuracy in the presence of corroded casing while performing stationary measurements within cased wells. Furthermore, apparatus and methods are disclosed which enable such improved measurements to be performed while the apparatus is being moved vertically in cased wells which is typically desirable in the industry.

The oil industry has long sought to measure resistivity through casing. Such resistivity measurements, and measurement of other electrochemical phenomena, are useful for at least the following purposes; locating by-passed oil and gas; reservoir evaluation; monitoring water floods; measuring quantitative saturations; cement evaluation; permeability measurements; and measurements through a drill string attached to a drilling bit. Therefore, measurements of resistivity and other electrochemical phenomena through metallic pipes, and steel pipes in particular, are an important subject in the oil industry. Many U.S. patents have issued in the pertinent Subclass 368 of Class 324 of the United States Patent and Trademark Office which address this subject. The following presents a brief description of the particularly relevant prior art presented in the order of descending relative importance.

U.S. Pat. No. 4,820,989 issued to the inventor, and Ser. No. 07/089,697 which will issue shortly to the inventor, are henceforth to be referenced together as the "Vail patents". These Vail patents predominantly describe apparatus having two pairs of voltage measurement electrodes which engage the interior of the casing, and which have a calibration means to calibrate for thickness variations and errors in the placements of the electrodes. The detailed descriptions of several particular methods of operation which are disclosed in the Vail patents have certain limitations in measurement accuracy due to "second order errors" that will be described in detail in the remaining portion of the application. Furthermore, while the Vail patents do briefly discuss taking data while moving in the well, the application herein provides detailed methods and apparatus for that purpose.

U.S. Pat. No. 4,796,186 which issued on Jan. 3, 1989 to Alexander A. Kaufman entitled "Conductivity Determination in a Formation Having a Cased Well" also mostly describes apparatus having two pairs of voltage measurement electrodes which engage the interior of the casing and which also have calibration means to calibrate for thickness variations in the casing and for errors in the placements of the electrodes. In general, different methods of operation are described in the Kaufman patent compared to the Vail patents cited above. The particular methods of operation in the Kaufman patent do not thoroughly describe how to eliminate all types of "second order errors", nor does the Kaufman patent describe how to build and operate an apparatus which takes data while moving vertically in the well.

U.S. Pat. No. 4,837,518 which issued on Jun. 6, 1989 to Michael F. Gard, John E. Kingman, and James D. Klein, assigned to the Atlantic Richfield Company, entitled "Method and Apparatus for Measuring the Electrical Resistivity of Geologic Formations Through Metal Drill Pipe or Casing", describes multiple voltage measurement electrodes within a cased well which engage the wall of the casing, henceforth referenced as "Arco's patent". However, Arco's patent does not describe an apparatus with two pairs of adjacent voltage measurement electrodes and associated electronics which takes the voltage differential between these two pairs to directly measure electronic properties adjacent to formations. Therefore, Arco's patent does not describe the methods and apparatus disclosed herein.

USSR Patent No. 56,026, which issued on Nov. 30, 1939 to L. M. Alpin, henceforth called the "Alpin patent", which is entitled "Process of the Electrical Measurement of Well Casings", describes an apparatus which has two pairs of voltage measurement electrodes which positively engage the interior of the casing. However, the Alpin patent does not have any suitable calibration means to calibrate for thickness variations nor errors in the placements of the electrodes. Therefore, the Alpin patent does not described the methods and apparatus disclosed herein.

U.S. Pat. No. 2,729,784, issued on Jan. 3, 1956 having the title of "Method and Apparatus for Electric Well Logging", and U.S. Pat. No. 2,891,215 issued on Jun. 16, 1959 having the title of "Method and Apparatus for Electric Well Logging", both of which issued in the name of Robert E. Fearon, henceforth called the "Fearon patents", describe apparatus also having two pairs of voltage measurement electrodes which engage the interior of the casing. However, an attempt is made in the Fearon patents to produce a "virtual electrode" on the casing in an attempt to measure leakage current into formation which provides for methods and apparatus which are unrelated to the Kaufman and Vail patents cited above. The Fearon patents neither provide calibration means, nor do they provide methods similar to those described in either the Kaufman patent or the Vail patents, to calibrate for thickness variations and errors in the placements of the electrodes. Therefore, the Fearon patents do not describe the methods and apparatus disclosed herein.

Accordingly, an object of the invention is to provide new and practical methods of measuring the resistivity of geological formations adjacent to cased wells which compensate for second order errors of measurement.

It is yet another object of the invention to provide new and practical methods of measuring the resistivity of geological formations adjacent to cased well which compensate for second order errors of measurement and which are also particularly adapted for acquiring data while moving vertically in the well.

And it is another object of the invention to provide new and practical apparatus capable of providing measurements of the resistivity of geological formations adjacent to cased wells which compensate for second order errors of measurement and which also are capable of acquiring data while moving vertically in the well.

And further, it is another object of the invention to provide new and practical methods and apparatus capable of measuring electrochemical phenomena through casing which compensate for second order errors of measurement.

And finally, it is another object of the invention to provide new and practical methods and apparatus capable of measuring electrochemical phenomena through casing which compensate for second order errors of measurement and which are also particularly adapted for acquiring data while moving vertically in the well.

The invention herein is described in two major different portions of the specification. In the first major portions of the specification, relevant parts of the text in Ser. No. 07/089,697 are repeated which describe apparatus defined in FIGS. 1, 3, 4, and 5. Such apparatus are perhaps ideally suited as stop-hold-and-lock apparatus for stationary measurements (although their applications are certainly not limited to stop-hole-and-lock situations). New and precise methods of measurement are then disclosed in this first portion of the text which provide for improved measurement accuracy of an apparatus in the presence of corroded casing while performing stationary measurements within cased wells. The second major portion of the specification herein is concerned with providing both apparatus and methods which enable such improved measurements to be performed while the apparatus is being moved vertically in cased wells which is typically desirable in the industry.

Figure 1:
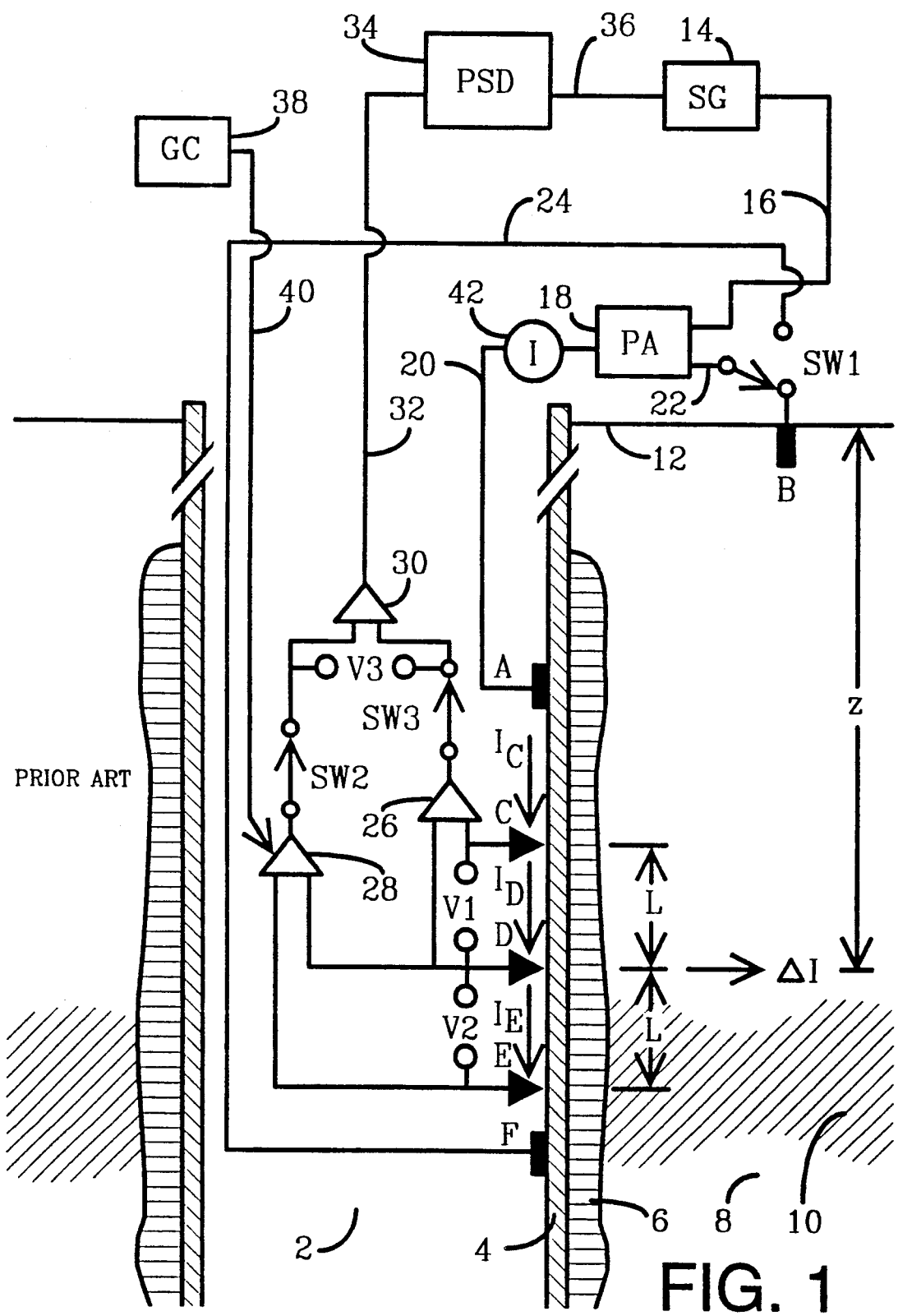
FIG. 1 is a sectional view of one preferred embodiment of the invention of the Thru Casing Resistivity Tool (TCRT).

FIGS. 1, 3, 4, and 5 in Ser. No. 07/089,697, now U.S. Pat. No. 4,882,542 and in those contained in this application are nearly identical. The following excerpt is taken word-for-word from Ser. No. 07/089,697, now U.S. Pat. No. 4,882,542:

"FIG. 1 shows a typical cased borehole found in an oil field. The borehole 2 is surrounded with borehole casing 4 which in turn is held in place by cement 6 in the rock formation 8. An oil bearing strata 10 exists adjacent to the cased borehole. The borehole casing may or may not extend electrically to the surface of the earth 12. A voltage signal generator 14 (SG) provides an A.C. voltage via cable 16 to power amplifier 18 (PA). The signal generator represents a generic voltage source which includes relatively simple devices such as an oscillator to relatively complex electronics such as an arbitrary waveform generator. The power amplifier 18 is used to conduct A.C. current down insulated electrical wire 20 to electrode A which is in electrical contact with the casing. The current can return to the power amplifier through cable 22 using two different paths. If switch SW1 is connected to electrode B which is electrically grounded to the surface of the earth, then current is conducted primarily from the power amplifier through cable 20 to electrode A and then through the casing and cement layer and subsequently through the rock formation back to electrode B and ultimately through cable 22 back to the power amplifier. In this case, most of the current is passed through the earth. Alternatively, if SW1 is connected to insulated cable 24 which in turn is connected to electrode F, which is in electrical contact with the casing, then current is passed primarily from electrode A to electrode F along the casing for a subsequent return to the power amplifier through cable 22. In this case, little current passes through the earth.

Electrodes C, D, and E are in electrical contact with the interior of casing. In general, the current flowing along the casing varies with position. For example, current $I_C$ is flowing downward along the casing at electrode C, current $I_D$ is flowing downward at electrode D, and current $I_E$ is flowing downward at electrode E. In general, therefore, there is a voltage drop V1 between electrodes C and D which is amplified differentially with amplifier 26. And the voltage difference between electrodes D and E, V2, is also amplified with amplifier 28. With switches SW2 and SW3 in their closed position as shown, the outputs of amplifiers 26 and 28 respectively are differentially subtracted with amplifier 30. The voltage from amplifier 30 is sent to the surface via cable 32 to a phase sensitive detector 34 (PSD). The phase sensitive detector obtains its reference signal from the signal generator via cable 36. In addition, digital gain controller 38 (GC) digitally controls the gain of amplifier 28 using cable 40 to send commands downhole. The gain controller 38 also has the capability to switch the input leads to amplifier 28 on command, thereby effectively reversing the output polarity of the signal emerging from amplifier 28 for certain types of measurements.

The total current conducted to electrode A is measured by element 42. In the preferred embodiment shown in FIG. 1, the A.C. current used is a symmetric sine wave and therefore in the preferred embodiment, I is the 0-peak value of the A.C. current conducted to electrode A. (The 0-peak value of a sine wave is $\frac{1}{2}$ the peak-to-peak value of the sine wave.)

In general, the SW1 connected to electrode B, current is conducted through formation. For example, current $\Delta I$ is conducted into formation along the length $2L$ between electrodes C and E. However, if SW1 is connected to cable 24 and subsequently to electrode F, then no current is conducted through formation to electrode B. In this case, $I_C = I_D = I_E$ since essentially little current $\Delta I$ is conducted into formation.

It should be noted that if SW1 is connected to electrode B then the current will tend to flow through the formation and not along the borehole casing. Calculations show that for 7 inch O.D. casing with a $\frac{1}{2}$ inch wall thickness that if the formation resistivity is 1 ohm-meter and the formation is uniform, then approximately half of the current will have flowed off the casing and into the formation along a length of 320 meters of the casing. For a uniform formation with a resistivity of 10 ohm-meters, this length is 1040 meters instead."

One embodiment of the invention described in Ser. No. 07/089,697 provides a preferred method of operation for the above apparatus as follows: "This first step in measuring the resistivity of the formation is to "balance" the tool. SW1 is switched to connect to cable 24 and subsequently to electrode F. Then A.C. current is passed from electrode A to electrode F thru the borehole casing. Even though little current is conducted into formation, the voltages V1 and V2 are in general different because of thickness variations of the casing, inaccurate placements of the electrodes, and numerous other factors. However, the gain of amplifier 28 is adjusted using the gain controller so that the differential voltage V3 is nulled to zero. (Amplifier 28 may also have phase balancing electronics if necessary to achieve null at any given frequency of operation.) Therefore, if the electrodes are subsequently left in the same place after balancing for null, spurious effects such as thickness variations in the casing do not affect the subsequent measurements.

With SW1 then connected to electrode B, the signal generator drives the power amplifier which conducts current to electrode A which is in electrical contact with the interior of the borehole casing. A.C. currents from 1 amps o-peak to 30 amps o-peak at a frequency of typically 1 Hz is introduced on the casing here. The low frequency operation is limited by electrochemical effects such as polarization phenomena and the invention can probably be operated down to 0.1 Hz and the resistivity still properly measured. The high frequency operation is limited by skin depth effects of the casing, and an upper frequency limit of the invention is probably 20 Hz for resistivity measurements. Current is subsequently conducted along the casing, both up and down the casing from electrode A, and some current passes through the brine saturated cement surrounding the casing and ultimately through the various resistive zones surrounding the casing. The current is then subsequently returned to the earth's surface through electrode B."

Therefore, in a preferred method of operation introduced in Ser. No. 07/089,697, first the tool is "balanced" for a null output from amplifier 30 when SW1 is connected to cable 24, and then the departure of the signal from null when SW1 is instead connected to electrode B provides a measure of the leakage current into formation. Such a method of operation does not automatically eliminate all "second order errors of measurement". An improved method of operation is described in a later section of this application which does automatically eliminate these "second order errors of measurement".

Figure 2:
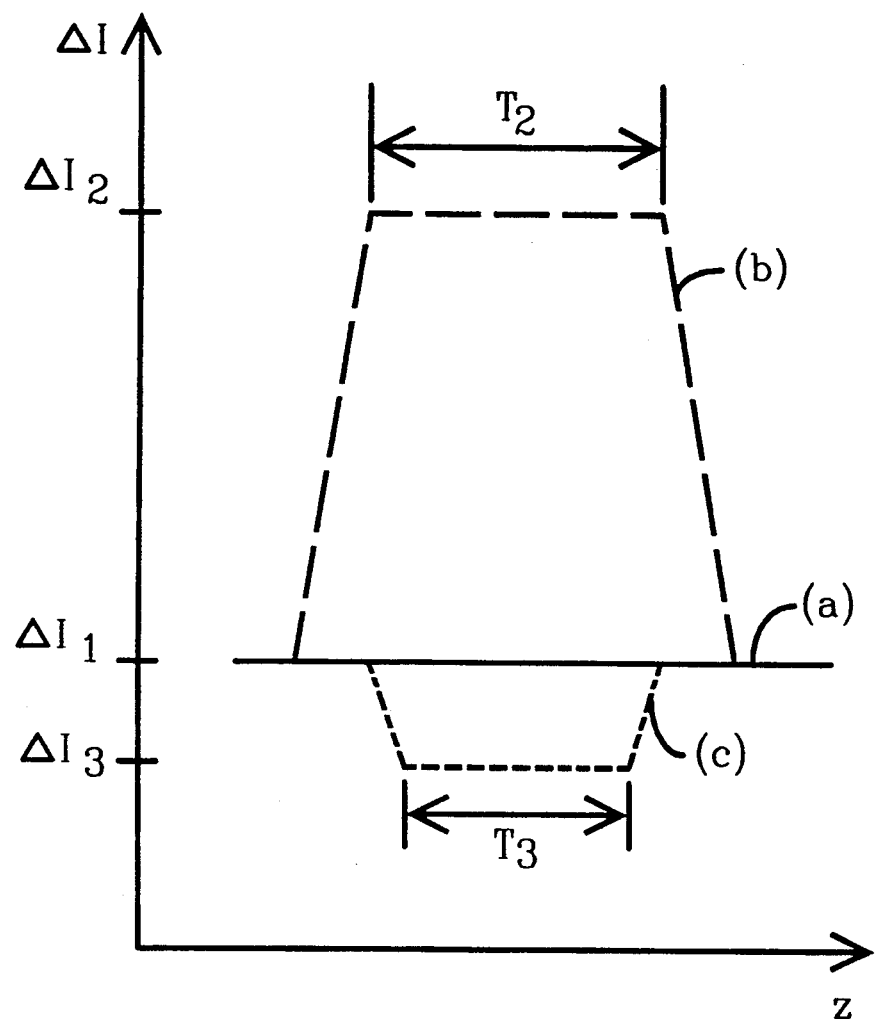
FIG. 2 shows $\Delta T$ vs. z which diagrammatically depicts the response of the tool to different formations.

Quoting further from Ser. No. 07/089,697: "FIG. 2 shows the differential current conducted into formation $\Delta I$ for different vertical positions z within a steel cased borehole. z is defined as the position of electrode D in FIG. 1. It should be noted that with a voltage applied to electrode A and with SW1 connected to electrode B that this situation consequently results in a radially symmetric electric field being applied to the formation which is approximately perpendicular to the casing. The electrical field produces outward flowing currents such as $\Delta I$ in FIG. 1 which are inversely proportional to the resistivity of the formation. Therefore, one may expect discontinuous changes in the current $\Delta I$ at the interface between various resistive zones particularly at oil/water and oil/gas boundaries. For example, curve (a) in FIG. 2 shows the results from a uniform formation with resistivity $\rho_1$. Curve (b) shows departures from curve (a) when a formation of resistivity $\rho_2$ and thickness $T_2$ is intersected where $\rho_2$ is less than $\rho_1$. And curve (c) shows the opposite situation where a formation is intersected with resistivity $\rho_3$ which is greater than $\rho_1$ which has a thickness of $T_3$. It is obvious that under these circumstances, $\Delta I_3$ is less than $\Delta I_1$, which is less than $\Delta I_2$.

Figure 3:
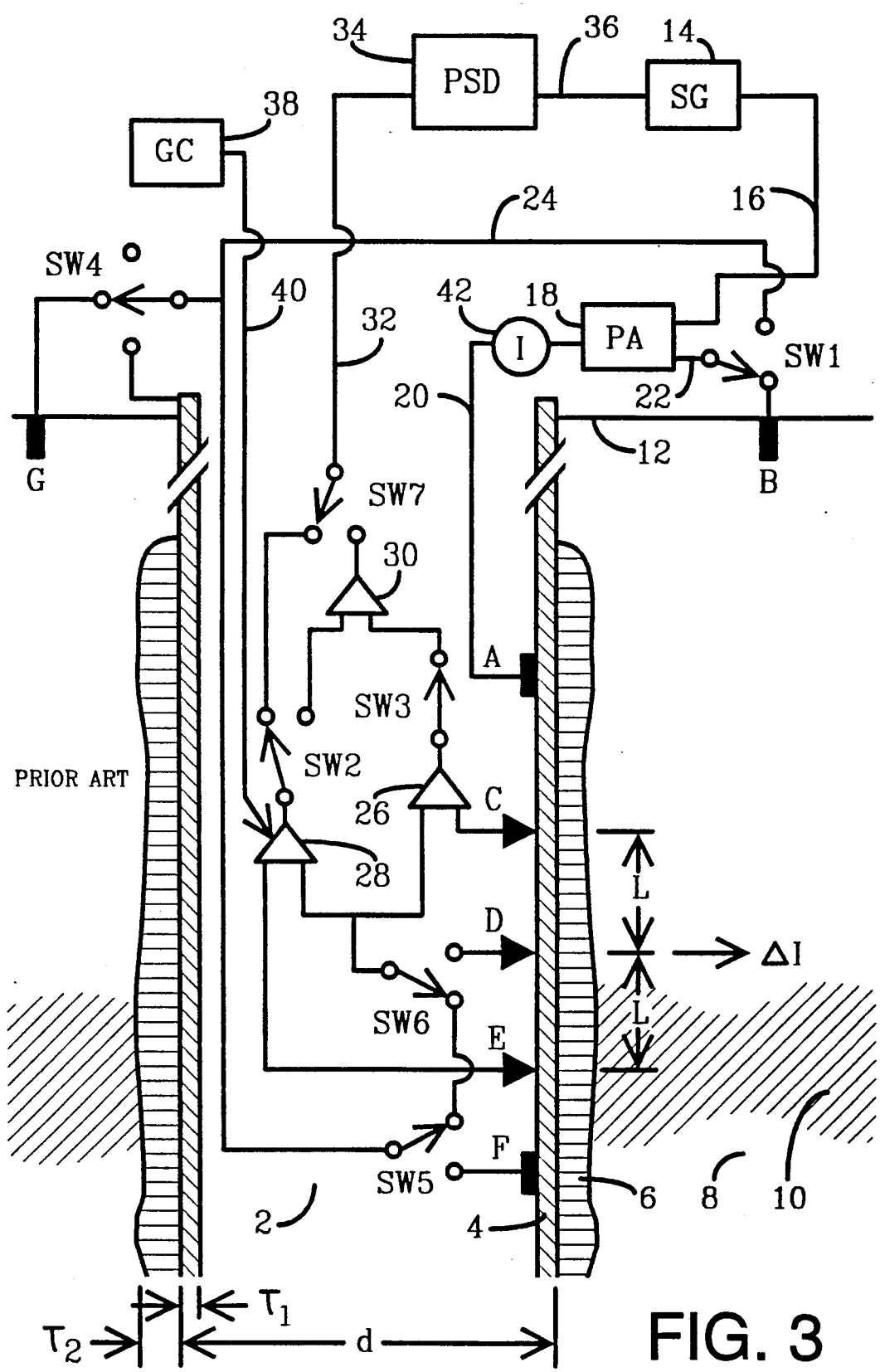
FIG. 3 is a sectional view of a preferred embodiment of the invention which shows how $V_o$ is to be measured.

FIG. 3 shows a detailed method to measure the parameter Vo. Electrodes A, B, C, D, E, and F have been defined in FIG. 1. All of the numbered elements 2 through 40 have already been defined in FIG. 1. In FIG. 3, the thickness of the casing is $\tau_1$, the thickness of the cement is $\tau_2$, and d is the diameter of the casing. Switches SW1, SW2, and SW3 have also been defined in FIG. 1. In addition, electrode G is introduced in FIG. 3 which is the voltage measuring reference electrode which is in electrical contact with the surface of the earth. This electrode is used as a reference electrode and conducts little current to avoid measurement errors associated with current flow.

In addition, SW4 is introduced in FIG. 3 which allows the connection of cable 24 to one of the three positions: to an open circuit; to electrode G; or to the top of the borehole casing. And in addition in FIG. 3, switches SW5, SW6, and SW7 have been added which can be operated in the positions shown. (The apparatus in FIG. 3 can be operated in an identical manner as that shown in FIG. 1 provided that switches SW2, SW5, SW6, and SW7 are switched into the opposite states as shown in FIG. 3 and provided that SW4 is placed in the open circuit position.)

With switches SW2, SW5, SW6, and SW7 operated as shown in FIG. 3, then the quantity Vo may be measured. For a given current I conducted to electrode A, then the casing at that point is elevated in potential with respect to the zero potential at a hypothetical point which is an "infinite" distance from the casing. Over the interval of the casing between electrodes C, D, and E in FIG. 3, there exists an average potential over that interval with respect to an infinitely distant reference point. However, the potential measured between only electrode E and electrode G approximates Vo provided the separation of electrodes A, C, D, and E are less than some critical distance such as 10 meters and provided that electrode G is at a distance exceeding another critical distance from the casing such as 10 meters from the borehole casing. The output of amplifier 28 is determined by the voltage difference between electrode E and the other input to the amplifier which is provided by cable 24. With SW1 connected to electrode B, and SW4 connected to electrode G, cable 24 is essentially at the same potential as electrode G and Vo is measured appropriately with the phase sensitive detector 34. In many cases, SW4 may instead be connected to the top of the casing which will work provided electrode A is beyond a critical depth . . . ".

Quoting further from Ser. No. 07/089,697: "For the purposes of precise written descriptions of the invention, electrode A is the upper current conducting electrode which is in electrical contact with the interior of the borehole casing; electrode B is the current conducting electrode which is in electrical contact with the surface of the earth; electrodes C, D, and E are voltage measuring electrodes which are in electrical contact with the interior of the borehole casing; electrode F is the lower current conducting electrode which is in electrical contact with the interior of the borehole casing; and electrode G is the voltage measuring reference electrode which is in electrical contact with the surface of the earth.

Furthermore, Vo is called the local casing potential. An example of an electronics difference means is the combination of amplifiers 26, 28, and 30. The differential current conducted into the formation to be measured is $\Delta I$." The differential voltage is that voltage in FIG. 1 which is the output of amplifier 30 with SW1 connected to electrode B and with all the other switches in the positions shown.

Figure 4:
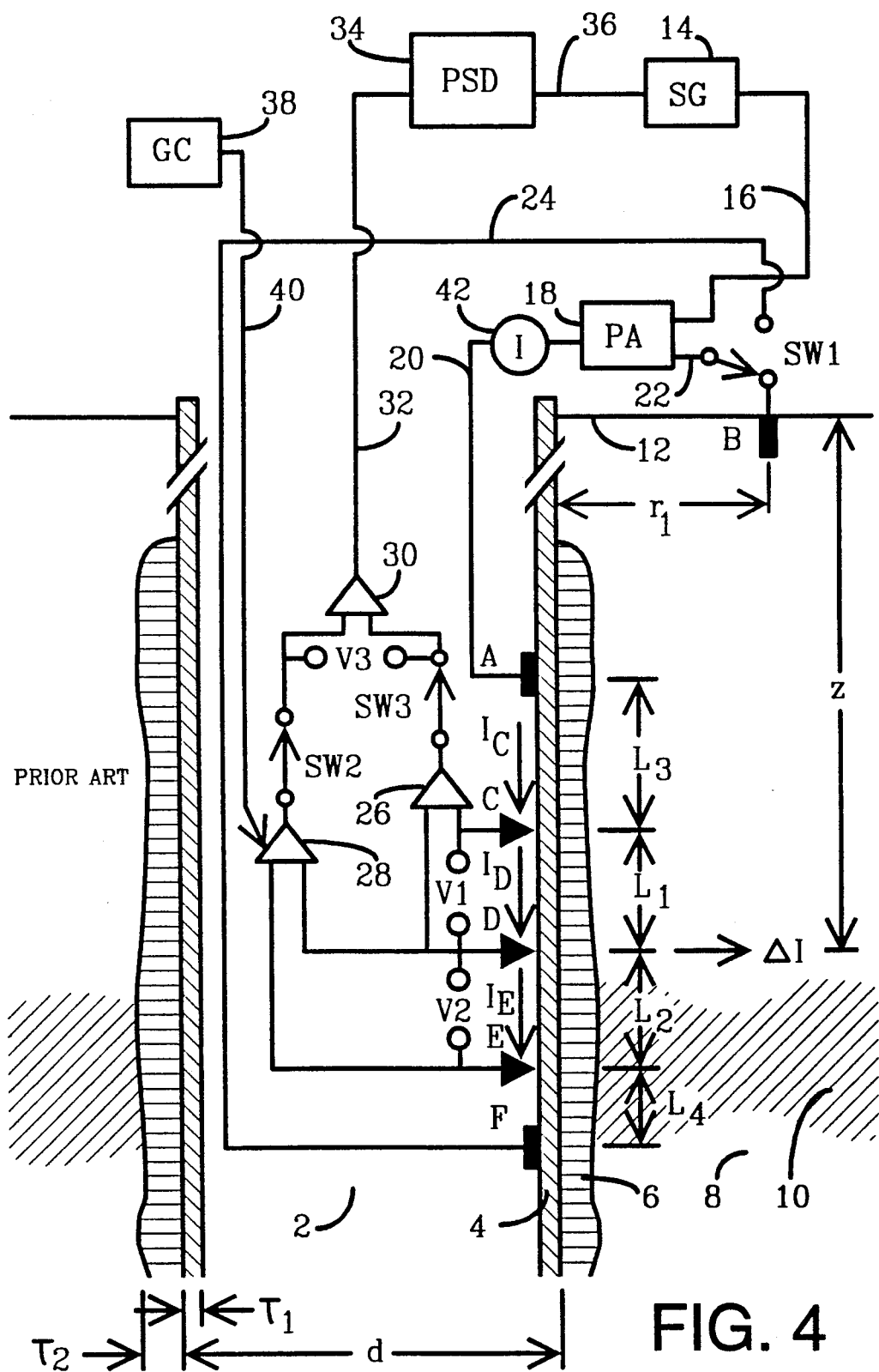
FIG. 4 is a sectional view of an embodiment of the invention which has voltage measurement electrodes which are separated by different distances.
Figure 5:
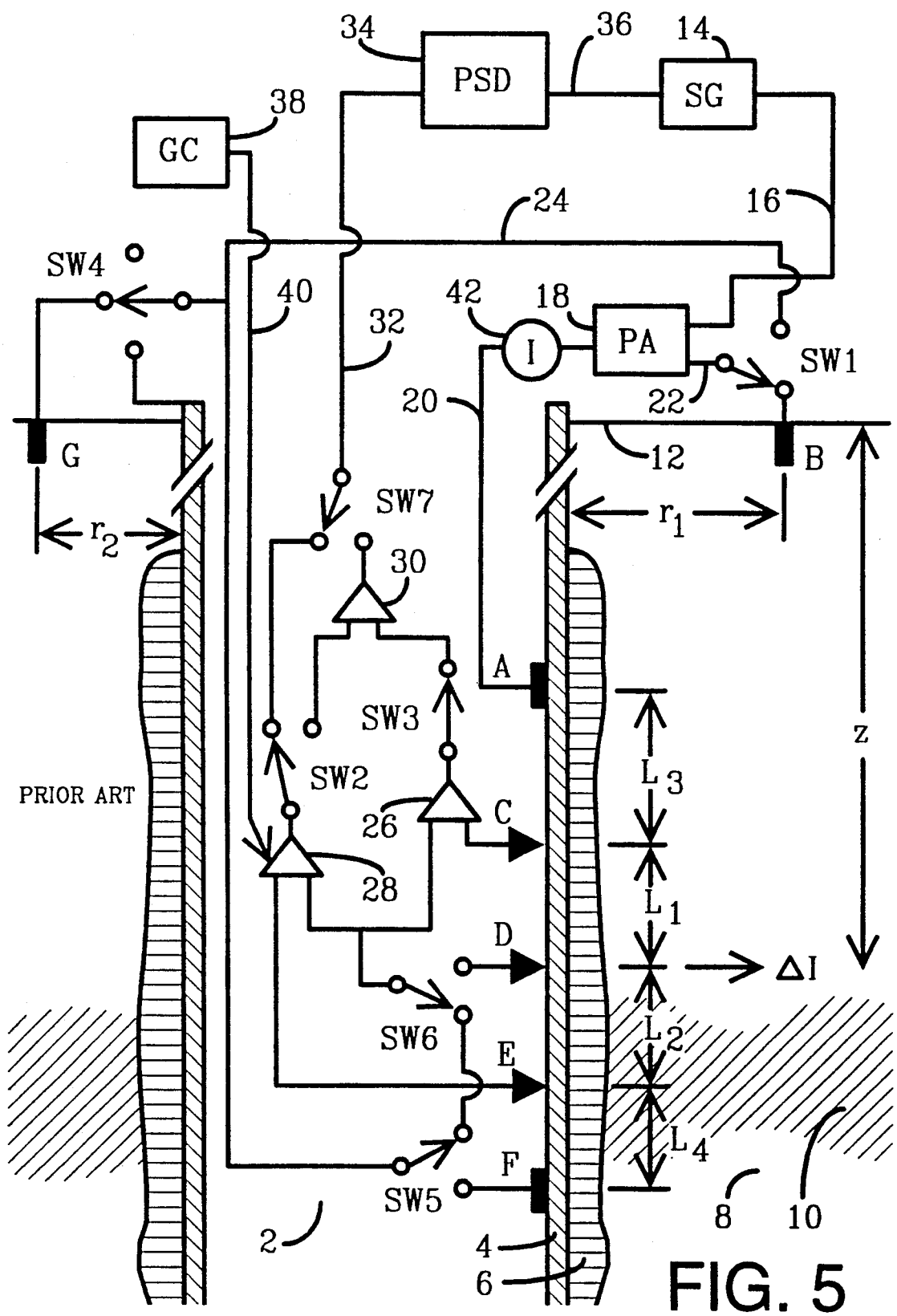
FIG. 5 is a sectional view of an embodiment of the invention which has electrodes which are separated by different distances and which shows explicitly how to measure $V_o$.

Further quoting from Ser. No. 07/089,697: "FIG. 4 is nearly identical to FIG. 1 except the electrodes C and D are separated by Length $L_1$, electrodes D and E are separated by $L_2$, electrodes A and C are separated by $L_3$ and electrodes E and F are separated by the distance $L_4$. In addition, $r_1$ is the radial distance of separation of electrode B from the casing. And z is the depth from the surface of the earth to electrode D. FIG. 5 is nearly identical to FIG. 3 except here too the distances $L_1$, $L_2$, $L_3$, $L_4$, $r_1$, and z are explicitly shown. In addition, $r_2$ is also defined which is the radial distance from the casing to electrode G. As will be shown explicitly in later analysis, the invention will work well if $L_1$ and $L_2$ are not equal. And for many types of measurements, the distances $L_3$ and $L_4$ are not very important provided that they are not much larger in magnitude than $L_1$ and $L_2$."

An improved method of operation of a preferred embodiment of the invention is now described in terms of FIG. 1. Using this "Preferred Method of Operation" disclosed herein, the apparatus can be placed in any one of three states: (1) the Preferred Measurement State; (2) the Preferred Null State; and (3) the Preferred Calibration State.

The three states defined in this Preferred Method of Operation of the invention are therefore defined as follows:

(1) The Preferred Measurement State of the apparatus in FIG. 1 is defined by the following configuration: SW1 is connected to electrode B; switch SW2 is closed; and switch SW3 is closed.

(2) The Preferred Null State of the apparatus in FIG. 1 is defined by the following configuration: SW1 is connected to cable wire 24 and therefore is electrically connected to electrode F; switch SW2 is closed; and switch SW3 is closed.

(3) The Preferred Calibration State of the apparatus in FIG. 1 is defined by the following configuration: SW1 is connected to cable 24 and therefore is electrically connected to electrode F; switch SW2 is open; and switch SW3 is closed.

The purpose of the following analysis is to determine a method of operation to acquire the experimental quantity $\Delta I$ in FIG. 1 which is relatively accurate, which is relatively unaffected by even substantial thickness variations in the casing, and which is not materially affected by inaccurate placements of the electrodes. Therefore, assume that the gains of amplifiers 26, 28, and 30 in FIG. 1 are respectively given by $a_1$, $a_2$, and $a_3$. Furthermore, assume that the resistance of the casing in ohms between electrode C and D is given by $R_1$; and that the resistance of the casing in ohms between electrodes D and E is given by $R_2$. In the following analysis, for the purposes of simplicity only, it is assumed that: (a) there is no phase shift between amplifiers; (b) there is no phase shift between the voltages appearing on the casing and the current conducted through the earth (caused by polarization effects, skin effects, or other electrochemical processes); and (c) that therefore the magnitudes representative of the amplitudes of low frequency A.C. quantities may be used in the following simplified analysis.

The average resistance of the casing between electrodes D and E is defined as the quantity $R_A$, which is given as the follows:

$$R_A = \{R_1 + R_2\}/2 \qquad \text{Equation 1.}$$

Therefore, there is a departure from average resistance of the first section of the casing between electrodes C and D defined as $\Delta R_1$ such that:

$$R_1 = R_A + \Delta R_1 \qquad \text{Equation 2.}$$

Furthermore, there is a departure from the average resistance of the second section of the casing between electrodes D and E defined as $\Delta R_2$ such that:

$$R_2 = R_A + \Delta R_2 \qquad \text{Equation 3.}$$

In the Preferred Null State of the apparatus, a current called the Null Current (defined as "$I_N$") is passed along the casing between electrodes C and E. Since relatively little current is expected to flow through formation in this state, then essentially the same current $I_N$ flows between electrodes C and D and between electrodes D and E. Therefore, the output voltage from amplifier 30 in this situation defined as $V_N$, which is given by the following:

$$V_N = a_3\{a_2 I_N(R_A + \Delta R_2) - a_1 I_N(R_A + \Delta R_1)\} \quad \text{Equation 4.}$$

Re-arranging terms in Equation 4, one obtains:

$$V_N = a_3 \gamma I_N \quad \text{Equation 5.}$$

The quantity $\gamma$ in Equation 5 is given by the following algebraic formula:

$$\gamma = \{a_2(R_A + \Delta R_2) - a_1(R_A + \Delta R_1)\} \quad \text{Equation 6.}$$

In the Preferred Measurement State of the apparatus, a "Total Measurement Current", defined as $I_T$, is passed between electrode A and electrode B on the surface of the earth. Only a portion of that Total Measurement Current is conducted downward along the casing between electrodes C and D, and that portion is called simply the "Measurement Current", defined as the quantity $I_M$. If $I_M$ is passing between electrodes C and D, then a certain current will leak off the casing between electrodes D and E which is defined as the quantity $\delta i_2$. Therefore, the current passing downward at electrode E, which is the quantity $L_E$, is given by the following:

$$I_E = I_M - \delta_2 \quad \text{Equation 7.}$$

Therefore, the output voltage from amplifier 30 in this situation is defined as $V_M$, which in a lumped component model approximation is given by the following:

$$V_M = a_3\{a_2(I_M - \delta i_2)(R_A + \Delta R_2) - a_1 I_M(R_A + \Delta R_1)\} \quad \text{Equation 8.}$$

Equation 8 simplifies to the following:

$$V_M = a_3 \gamma I_M - a_2 a_3 \delta i_2 (R_A + \Delta R_2) \quad \text{Equation 9.}$$

In the Preferred Calibration State of the apparatus, the calibration current, $I_{CA}$, is passed along the casing between electrodes C and E. Since relatively little current is expected to flow through formation in this state, then essentially the same current $I_{CA}$ flows between electrodes C and D and between electrodes D and E. In the Preferred Calibration State, SW2 is open, so that the output from amplifier 30 in this state, $V_{CA}$, is given by the following:

$$V_{CA} = -a_1 a_3 I_{CA}(R_A + \Delta R_1)/D \quad \text{Equation 10.}$$

Here, the parameter D is a gain reduction parameter, or divider factor, to avoid saturation of amplifier 30 if SW2 is open, although the means to do so is not explicitly shown in FIG. 1. Basically, when SW2 is open, then the output of amplifier 30 is divided by the parameter D which was found to be useful during field tests. In this embodiment, the gain controller 38 in FIG. 1 has at least the ability to open and close switches SW2, SW3, and to divide the output of amplifier 30 by the factor D.

There are three fundamentally different independent measurements performed which are summarized in the following equations: Equation 5, Equation 9, and Equation 10. The gains $a_1$, $a_2$, and $a_3$ are assumed to be known to an accuracy of 0.1%. The following currents are measured during the various different states: $I_N$, $I_M$, and $I_{CA}$. Therefore, Equations No. 5, 9, and 10 contain essentially three fundamental unknowns, $\delta i_2$, $R_1$, and $R_2$. Three equations with three unknowns always have a unique solution. One such solution used in practice that minimizes certain types of required measurement accuracies is described in the following.

A convenient parameter to calculate for the analysis herein is called $\Delta V$, which is defined as follows:

$$\Delta V = V_M - V_N \quad \text{Equation 11.}$$

Using $V_M$ from Equation 9, and $V_N$ from Equation 5, then the quantity $\Delta V$ is given as follows:

$$\Delta V = a_3 \Delta(I_M - I_N) - a_2 a_3 \delta i_2 (R_A + \Delta R_2) \quad \text{Equation 12.}$$

Using Equation 10, and solving for the quantity $R_A$:

$$R_A = \{-D\, V_{CA}/(a_1 a_3 I_{CA})\} - \Delta R_1 \quad \text{Equation 13.}$$

Substituting $R_A$ from Equation 13 into Equation 12, then the quantity $\Delta V$ becomes:

$$\begin{aligned} \Delta V =\ & (a_2/a_1)(\delta i_2/I_{CA})\Delta V_{CA} && \text{[Term A]} \\ & + a_3 \gamma(I_M - I_N) && \text{[Term B]} \\ & - a_2 a_3 \delta i_2 (\Delta R_2 - \Delta R_1) && \text{[Term C]} \end{aligned}$$
Equation 14

Equation 14 is the central result of this analysis. Terms A, B, and C appear in sequence in Equation 14 and are identified by the square brackets adjacent to each respective term. Term A describes useful information related to measuring the leakage current flowing into formation. Term B is a first order error term which is present if the measurement current $I_M$ is not equivalent to the null current $I_N$ and if there are different resistances in different portions of the casing. Term C is the second order error term which is due to the product of the difference in resistances between different sections of casing times the leakage current flowing into formation. Term C is called a second order term because it is the product of two quantities which can each be very small under ideal circumstances.

For the purpose of showing the relative numerical sizes of Terms A, B, and C, and their relative importance, these terms are now calculated for the following values:

$$\begin{aligned} a_1 &= a_2 = A \\ a_3 &= 10 \\ D &= 10 \\ \Delta R_1 &= -0.1 R_A \\ \Delta R_2 &= +0.3 R_A \\ I_N &= I_{CA} = I_o \end{aligned}$$
Equation 15

Furthermore, for the purpose of conveying the importance of the first order error Term B above, it is assumed that the currents $I_M$ and $I_N$ are almost, but not quite equal as follows:

$$I_M - I_N = -0.01 I_o \quad \text{Equation 16.}$$

Equation 10 is first used to calculate the quantity $V_{CA}$ in Term A of Equation 14; then Equations 15 and 16 are substituted into Equation 14; and using Equation 6 for the quantity $\gamma$; then Equation 14 becomes:

$$\text{Term A} = -0.90\, A\, a_3\, \delta i_2\, R_A \quad \text{Equation 17.}$$

Term B = −0.401 A a$_3$ I$_o$ R$_A$  Equation 18.

Term C = −0.40 A a$_3$ δi$_2$ R$_A$  Equation 19.

In this example, the second order error term, Term C is significant. Keeping in mind that Term A has the information desired related to current leakage from the casing:

Term B/Term A = 0.44  Equation 20.

The second order error term causes a 44% error in computing the leakage current if only Term A of Equation 14 is used to calculate leakage current into formation. Therefore, it is concluded that methods for compensation of second order errors are important for improved measurement accuracy.

With a leakage current of about 30 milliamps, and with current I$_o$ of 5 amps, then the ratio of Terms B to A becomes:

Term B/Term A = 0.74  Equation 21/

Therefore, if the currents I$_M$ and I$_N$ are equal to only 1% as in Equation 16, 74% measurement errors are to be expected in this example if only Term A in Equation 14 is used to calculate the leakage current flowing into formation.

The result in Equation 21 also points up an important aspect of this analysis. If the currents I$_M$ and I$_N$ were different by 50% as is typically the case if the total currents delivered to the casing through current meter 42 were kept constant for different switch positions of SW1, then errors on the order of at least 25 times the size of the quantity to be measured would be present in the example cited. To compensate for such larger errors, the resistances R$_1$ and R$_2$ would have to be measured to an accuracy approaching 5 significant decimal places for the required measured accuracy of the leakage current! This 5 place accuracy is difficult to achieve because of cross-talk in the wirelines, magnetic pick-up, and other effects that are to be discussed in another related application. By contrast, the method of operation described above only requires consistent measurement accuracy of the various quantities to typically 3 decimal places which is much easier to achieve in practice.

Therefore, in practice in one embodiment of the invention, the currents I$_M$ and I$_N$ are to be made equal to an accuracy of one part in one thousand (0.1%) to give acceptable measurement errors of the leakage current to accuracies better than 10% if Term B in Equation 14 is to be neglected during interpretation of the data. Consequently, in practice to avoid first order errors of measurement if Term B is to be neglected (and a$_1$ = a$_1$ = A):

Absolute Magnitude of (I$_M$ − I$_N$) ≦ 0.001 I$_o$  Equation 22.

Equation 14 is the central result and is used to interpret the data. Now that the importance of the various terms have been established, the following logic is used to put Equation 14 in a form that is used in practice in one embodiment of the invention. In particular, if the gains of amplifiers 26 and 28 are equal, then the following is used to simplify Equation 14:

a$_1$ = a$_2$ = A  Equation 23.

Substituting Equation 23 into Equation 6 for the quantity γ gives the following that may be used to simplify Term B in Equation 14:

$$\gamma = A(\Delta R_2 - \Delta R_1)$$  Equation 24.

Term C in Equation 14 can be put into another form more useful for this analysis if Equation 23 is substituted into Equations 5 and 6 thereby providing:

$$(\Delta R_2 - \Delta R_1) = V_N/(a_3 A\ I_N)$$  Equation 25.

Therefore, Equation 24 is used to simplify Term B in Equation 14, and Equation 25 is used to simplify Term C in Equation 14, thereby providing:

$$\Delta V = \delta i_2 \{(D\ V_{CA}/I_{CA}) - (V_N/I_N)\} + a_3 A\{(I_M - I_N)(\Delta R_2 - \Delta R_1)\}$$  Equation 26

The first line of Equation 26 has the corresponding Terms A and C from Equation 14. The second line of Equation 26 corresponds to Term B of Equation 14. Please notice that this second term is the mathematical product of the difference in resistances between various sections of casing times the difference between the measurement and null currents, which in general is a first order error term that is very large unless the measurement and null currents are deliberately chosen to be equal for reasons discussed above.

In a preferred method of operation the invention, the experimental parameters may be set such that:

$$I_M = I_N = I_{CA} = I_o$$  Equation 27.

In practice, these currents are made equal by demanding that the voltage from amplifier 30 with SW2 open, and SW3 closed, be the same voltage for both possible states of SW1. For each position of SW1, suitable adjustments are made on the output voltage of the signal generator 14 in FIG. 1 such that the current flowing between electrodes C and D is always the same for each position of SW1 in this preferred embodiment of the invention.

If Equation 27 is exactly valid, then Term B in Equation 26 is zero. Using Equation 11 to eliminate the quantity ΔV in Equation 26, then Equation 26 becomes the following:

$$\delta i_2 = I_o(V_M - V_N)/(D\ V_{CCA} - V_N)$$  Equation 28.

This is the primary result which provides the quantity δi$_2$ which is not affected by second order errors of measurement caused by different resistances in adjacent regions of the casing. The quantity δi$_2$ is also not affected by first order errors of measurement.

Therefore, at least three measurements of different quantities are necessary to eliminate significant measurement errors and to provide accurate results. In the case shown above, three independent measurements result in measuring three experimentally independent quantities: δi$_2$, R$_1$, and R$_2$. Put another way, first and second compensation measurements are performed to correct a third measurement of the current leaking into formation from the casing to obtain accurate results.

Furthermore, the apparatus has been used in three different configurations providing a first compensation means (Preferred Null State) and then a second compensation means (Preferred Calibration State) to obtain accurate measurements of the leakage current (in the Preferred Measurement State).

It is to be briefly noted that Equation 6 U.S. Pat. No. 4,796,186 is directed toward eliminating various types of measurement errors. That equation has been analyzed using the above concepts. In the language contained herein, Equation 6 in U.S. Pat. No. 4,796,186 does in fact eliminate first order errors of measurement like Term B in Equation 14. However, it does not eliminate second order errors of measurement like Term C in Equation 14. This does make sense since U.S. Pat. No. 4,796,186 emphasizes making two independent measurements to obtain data (one compensation step, and one measurement step). The application herein has shown that second order measurement errors are of importance which therefore requires a method having two independent compensation steps and one final measurement step to eliminate those second order measurement errors.

U.S. Pat. No. 4,820,989 defines a method of analysis which gives the resistivity of adjacent formations. See particularly Equations 6, 8 and Equation 9 (as corrected in a Certificate of Correction). However, in that U.S. Patent, the quantity $\Delta I$ is discussed which is the combined current loss between both electrodes C-D and between electrodes D-E. However, here, this method of operation distinguishes between the current loss between electrode C and D which is $\delta i_1$, and the current loss between electrodes D and E which is $\delta i_2$. Therefore, using a lumped component model approximation:

$$\delta i_2 = \Delta I - \delta i_1 \qquad \text{Equation 29.}$$

To obtain the resistivity of the adjacent formation, the following analysis is needed. The contact resistance $R_c$ of a cylindrical electrode of length t and of diameter d in contact with a formation of resistivity $\rho$ given theoretically by the following (Earth Resistances, G. F. Tagg, Pitman Publishing Corporation, N.Y. 1964, pg. 96):

$$\begin{aligned} R_c &= \rho \{Ln(4t/d)\}/(2\pi t) \\ &= \rho\, C. \end{aligned} \qquad \text{Equation 30}$$

The geometric constant C is defined from theoretical considerations in Equation 30. The experimentally measured value of the contact resistance, $R_c$, is given by the following:

$$R_c = V_o/\delta i_2 \qquad \text{Equation 31.}$$

$V_o$ in Equation 31 is given by the measured potential voltage on the casing for the current $I_o$ defined in Equation 28. Therefore, the resistivity $\rho$ is given by the following:

$$\rho = V_o/(C\delta i_2) \qquad \text{Equation 32.}$$

Equation 32 provides the result used to interpret data for the preferred method of operation herein. It should be noted that the calculated value of C defined in Equation 30 relies upon the validity of the argument that the section of casing of length t may be approximated by an ellipsoid of revolution described by Tagg. It is to be expected that the detailed value of C calculated from Equation 30 may not be highly accurate because of this approximation. It is reasonable, therefore, to expect that the parameter C in Equation 32 needs to be fitted to data obtained with a particular apparatus and particular separation of electrodes. Calibrating the apparatus against a formation with known resistivity adjacent to a casing that was measured before the casing was set is sufficient for the purpose of empirically determining the parameter C. Equation 32 can be further simplified by using the parameter K where $K = 1/C$ wherein C is determined empirically as stated. Then using Equation 31 for the definition of $R_c$, Equation 32 becomes the following:

$$\rho = K\, R_c \qquad \text{Equation 33.}$$

Figure 6:
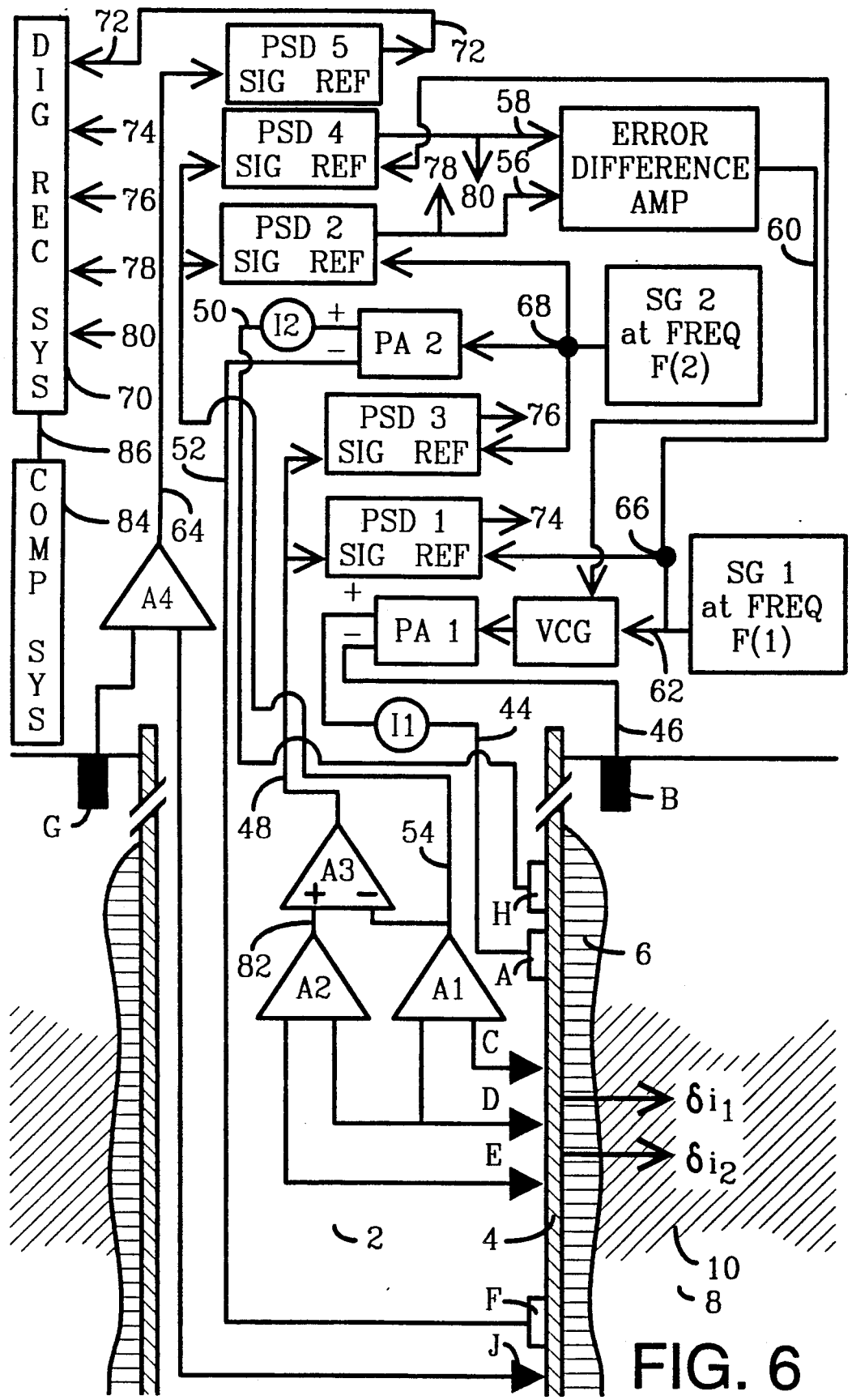
FIG. 6 is a sectional view of an embodiment of the invention which is adapted to take measurements while moving vertically in the cased well.

The second major portion of the specification is used to describe FIG. 6 which presents an apparatus adapted to take data while moving which allows utilization of the preceding fundamental analysis. A preferred apparatus optimally adapted to take data while moving which uses the above fundamental methods of analysis requires a machine which simultaneously acquires data analogous to that provided above in the Preferred Measurement State; the Preferred Null State; and in the Preferred Calibration State. The apparatus in FIG. 6 is adapted to acquire data in the analogous Preferred Measurement State at a first frequency of operation, called "F(1)" (perhaps 1 Hz for example); is adapted to simultaneously acquire data in the analogous Preferred Null State of the apparatus at a second frequency of operation, called "F(2)" (perhaps 2 Hz for example); and that is adapted to simultaneously provide data in the analogous Preferred Calibration State which ultimately is used to keep the current flowing between electrodes C and D at the two frequencies of operation to be the same as required by the conditions of Equation 27 above.

For the purpose of logical introduction, the elements in FIG. 6 are first briefly compared to those in FIGS. 1-5. This introduction also serves to identify the various legends used in FIG. 6. Elements No. 2, 4, 6, 8, and 10 have already been defined. Electrodes A, B, C, D, E, F, G and the distances $L_1$, $L_2$, $L_3$, and $L_4$ have already been described. The quantities $\delta i_1$ and $\delta i_2$ have already been defined in the above text. Amplifiers labeled with legends A1, A2, and A3 are analogous respectively to amplifiers 26, 28, and 30 defined in FIGS. 1, 3, 4, and 5. In addition, the apparatus in FIG. 6 provides for the following:

(a) two signal generators labeled with legends "SG 1 at Freq F(1)" and "SG 2 at Freq F(2)";

(b) two per amplifiers labeled with legends "PA 1" and "PA 2";

(c) a total of 5 phase sensitive detectors "PSD 1", "PSD 2", "PSD 3", "PSD 4", and "PDS 5", which respectively have inputs for measurement labeled with legends "SIG" which have inputs for reference signals labeled with legends "REF", which have outputs defined by lines having arrows pointing away from the respective units, and which are capable of rejecting all signal voltages at frequencies which are not equal to that provided by the respective reference signals;

(d) an "Error Difference Amp" so labeled with this legend in FIG. 6;

(e) an instrument which controls gain with voltage, typically called a "voltage controlled gain", which is labeled with legend "VCG";

(f) an additional current conducting electrode labeled with legend "H" (which is a distance $L_5$—not shown—above electrode A);

(g) an additional voltage measuring electrode labeled with legend "J" (which is a distance $L_6$—not shown—below electrode F);

(h) current measurement devices, or meters, labeled with legends "I1" and "I2";

(i) and differential voltage amplifier labeled with legend "A4" in FIG. 6.

The apparatus works as follows. Analogously to the "Preferred Measurement State", SG 1 provides the basic signal voltage to the VCG which determines the output level of PA 1 which therefore conducts current at frequency R(1) through meter I1, through cable 44 to electrode A, and then between electrodes A and B through the geological formation, and from electrode B through cable 46 back to PA 1. Therefore, a voltage drop at the frequency F(1) appears along the casing between electrodes C-D and D-E. Amplifier A1 takes the difference in voltage between electrodes C-D; amplifier A2 takes the difference in voltage between electrodes D-E; and amplifier A3 takes the voltage difference between the outputs in voltage from respectively amplifiers A2 and A1 which is sent uphole to PSD 1 and PSD 3 by cable 48. The voltage measured by PSD 1 is that analogous to $V_M$ above.

Analogously to the "Preferred Null State", SG 2 provides the basic signal voltage which determines the output level of PA 2 which therefore conducts current at frequency F(2) through meter I2, through cable 50 to electrode H, through a section of casing to electrode F, and then back through cable 52 to PA 2. Therefore, a voltage drop at the frequency F(2) also appears along the casing between electrodes C-D and D-E. Amplifier A1 takes the difference in voltage between electrodes C-D; amplifier A2 takes the different in voltage between electrodes D-E; and amplifier A3 takes the voltage difference between the outputs in voltage from respectively amplifiers A2 and A1 which is sent uphole to PSD 1 and PSD 3 by cable 48. The voltage measured by PSD 3 is analogous to $V_N$ defined above.

Analogously to the Preferred Calibration State, the voltage appearing across electrodes C-D is amplified by amplifier A1 which is then sent via cable 54 to both PSD 2 and PSD 4. PSD 4 measures a quantity related to the current at frequency F(1) flowing through the casing between electrodes C-D. PSD 2 measures a quantity related to the current at frequency F(2) flowing through the casing between electrodes C-D which is analogous to the quantity $V_{CA}$ defined above. The outputs from PSD 2 and PSD 4 are sent by cables respectively 56 and 58 to the Error Difference Amp, which provides an error signal to the VCG through cable 60. The voltage provided to the VCG by SG 1 on cable 62 provides the basic level of current passing through meter I1. However, the error voltage provided to the VCG by cable 60 provides adjustments in the current passing through I1 such that the currents at frequencies F(1) and at (F)2 passing through the section of casing between electrodes C and D are equal to the level of precision defined in Equation 22 above. The outputs of PSD 1, 2, 3, and 4 are recorded on a digital recording system 70 labeled with legend "DIG REC SYS". The respective outputs of the phase sensitive detectors are connected to the respective inputs of the digital recording system in FIG. 6 according to legends labeled with numbers 72, 74, 76, 78 and 80. One such connection is expressly shown in the case of element no. 72.

The outputs of PSD 1, 2, 3, 4, are recorded on a digital recording system which is not shown. The data so provided yields sufficient information to calculate a leakage current analogous to that defined in Equation 28. The exact algebraic equation appropriate for the apparatus depends upon the gains chosen for A1, A2, A3, and A4, but an equation analogous to Equation 28 for the moving system can be easily determined. A computing system receiving data from the recording system can then be used to calculate the current leakage into formation. FIG. 6 shows wire 82 that connects the output of amplifier A2 to an input of amplifier A3. FIG. 6 shows the computing system 84 labeled with legend "COMP SYS" that obtains data from the digital recording system 70 via cable 86.

To get resistivity, the potential voltage $V_o$ is needed. Therefore, electrode J provides one of two input voltages to amplifier A4, the other coming from electrode G. The differential voltage output of amplifier A4 is sent to PSD 5 via cable 64. PSD 5 obtains its reference voltage from SG 1 at frequency F(1). $V_o$ is measured at the frequency F(1) by PSD 5. Therefore, sufficient information is provided to the recording and computing system to calculate the resistivity in a form analogous to Equation 32 above.

For the purposes of clarity please notice that SG 1 provides an output voltage at frequency F(1) which is connected to voltage node 66 which in turn is connected to the reference inputs of PSD 1, PSD 4, and PSD 5. Furthermore, please also notice that SG 2 provides a voltage output at frequency F(2) which is connected to voltage node 68 which in turn is connected to the reference inputs of PSD 2 and PSD 3.

To briefly to summarize: PSD 1 measures a quantity analogous to $V_M$; PSD 3 measures a quantity analogous to $V_N$; PSD 2 and PSD 4 are used to keep the current constant at the two frequencies between electrodes C and D; and PSD 5 measures $V_o$. The recording and computing system then computes the current leakage into formation, the local casing potential voltage, and the resistivity of the adjacent geological formation while the system is being drawn vertically upward in the well.

Other components typically used in the wireline industry are to be provided with the apparatus which are not shown, but which include: depth control instrumentation; logging vehicles and wirelines; pressure housings for the downhole instrumentation, etc. It is assumed that the accustomed art in the industry is to be implemented in the invention for the blue-print type design of the invention and for the fabrication of the invention. Typical methods of "de-bugging" the apparatus are to be employed including empirically determining the maximum vertical draw rate of the apparatus by successively moving at faster and faster speeds until a critical speed is reached whereby the results no longer agree with results at stationary or slower speeds of movement.

While the above description contains many specificities, these should not be construed as limitations on the scope of the invention, but rather as exemplification of preferred embodiments thereto. As has been briefly described, there are many possible variations. Furthermore, the apparatus and methods described may be used for at least the following purposes: locating bypassed oil and gas; reservoir evaluation; monitoring water floods; measuring quantitative saturations; cement evaluation; permeability measurements; and measurements through a drill string attached to a drilling bit. Accordingly, the scope of the invention should be determined not only by the embodiments illustrated, but by the appended claims and their legal equivalents.

What is claimed is:

1. A method of determining the resistivity of geological formations from within a cased well that provides three independent measurements including a current leakage measurement quantity, first order error information, and second order error information to provide an accurate determination of the resistivity of a geological formation adjacent to a cased well, comprising:

providing three spaced electrode means that electrically engage a particular section of casing with a first resistance being defined between first and second electrode means and a second resistance being defined between second and third electrode means;

providing current conducting means and current generating means causing a first current to flow into the geological formation from the particular section of casing and causing a second current to flow along the particular section of casing;

obtaining a current leakage measurement quantity relating to first current flow into the formation and the magnitudes of the first and second resistances;

obtaining first order error information related to second current flow along the casing and any differences between the first and second resistances;

obtaining second order error information related to any first current flow into formation and any differences between the first and second resistances; and determining a magnitude relating to the resistivity of the geological formation by compensating said current leakage measurement quantity with said first order error information and with said second order error information to provide information useful for the accurate determination of the resistivity of the geological formation adjacent to cased the cased well.

2. A method of determining the resistivity of geological formations from within a cased well providing a measurement quantity and two compensation quantities to provide an accurate determination of the resistivity of a geological formation adjacent to a cased well, comprising:

providing three vertically spaced apart electrodes which electrically engage a particular section of casing with a first resistance being defined between first and second electrode means and a second resistance being defined between second and third electrode means;

providing current conducting means and current generating means causing a first current to flow from the particular section of casing into the geological formation and causing a second current to flow along the particular section of casing;

obtaining a measurement quantity relative to first current flow into the formation and the magnitudes of the first and second resistances;

obtaining a first compensation quantity related to second current flow along the casing and any differences between the first and second resistances;

obtaining a second compensation quantity related to any first current flow into formation and any differences between the first and second resistances; and using said first compensation quantity and said second compensation quantity to compensate said measurement quantity to provide information useful for the accurate determination of the resistivity of the geological formation adjacent to the particular section of the cased well.

* * * * *